United States Patent
Shi et al.

(10) Patent No.: US 10,031,930 B2
(45) Date of Patent: Jul. 24, 2018

(54) RECORD SCHEMAS IDENTIFICATION IN NON-RELATIONAL DATABASE

(71) Applicant: INTERNATIONAL BUSINESS MACHINES CORPORATION, Armonk, NY (US)

(72) Inventors: Ju Wei Shi, Beijing (CN); Chen Wang, Beijing (CN); Lan Jun Wang, Beijing (CN); Jia Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 14/830,158

(22) Filed: Aug. 19, 2015

(65) Prior Publication Data
US 2016/0063038 A1 Mar. 3, 2016

(30) Foreign Application Priority Data
Aug. 28, 2014 (CN) .......................... 2014 1 0429768

(51) Int. Cl.
*H04L 9/14* (2006.01)
*G06F 17/30* (2006.01)

(52) U.S. Cl.
CPC .. *G06F 17/30292* (2013.01); *G06F 17/30221* (2013.01); *G06F 17/30345* (2013.01); *G06F 17/30377* (2013.01)

(58) Field of Classification Search
CPC ............................................... G06F 17/30292
USPC .................................................. 707/802–803
See application file for complete search history.

(56) References Cited

U.S. PATENT DOCUMENTS

| 6,279,007 | B1 | 8/2001 | Uppala | |
| 7,016,906 | B1* | 3/2006 | Janzig | G06F 17/30607 |
| 8,495,055 | B2 | 7/2013 | Shmueli et al. | |
| 8,862,588 | B1* | 10/2014 | Gay | G06F 17/30336 707/741 |
| 9,210,178 | B1* | 12/2015 | Roth | H04L 63/105 |
| 2007/0239742 | A1 | 10/2007 | Saha et al. | |
| 2008/0063209 | A1* | 3/2008 | Jaquette | G06F 21/80 380/284 |
| 2009/0282048 | A1* | 11/2009 | Ransom | G06F 17/30094 |

(Continued)

OTHER PUBLICATIONS

E. Rahm, et al.,"A Survey of Approaches to Automatic Schema Matching," The VLDB Journal 10, Digital Object Identifier, Nov. 21, 2001, pp. 1-17.

(Continued)

*Primary Examiner* — Hanh B Thai
(74) *Attorney, Agent, or Firm* — Cantor Colburn LLP; David Quinn

(57) ABSTRACT

Embodiments include methods and devices for identifying record schemas in a non-relational database by assigning a record to a schema bucket according to structural characteristics of the record and identifying a record schema of the record within the schema bucket so that records with isomorphic record schemas in the non-relational database can be determined. Aspects also include encoding keys of a lowest level of a record according to a global codemap, sorting the keys of the lowest level that belong to different parent keys respectively and updating key names of corresponding parent keys in the parent level of a children level according to the codes of the keys of the children level.

4 Claims, 9 Drawing Sheets

(56) References Cited

U.S. PATENT DOCUMENTS

| | | | |
|---|---|---|---|
| 2012/0109935 A1 | 5/2012 | Meijer | |
| 2013/0166568 A1* | 6/2013 | Binkert | G06F 17/30911 707/741 |
| 2013/0282765 A1 | 10/2013 | Bhattacharjee et al. | |
| 2014/0095549 A1 | 4/2014 | Shi et al. | |
| 2014/0201244 A1* | 7/2014 | Zhou | G06F 17/30917 707/803 |
| 2014/0270153 A1* | 9/2014 | Scarpino | H04L 9/0822 380/28 |
| 2015/0379424 A1* | 12/2015 | Dirac | G06N 99/005 706/12 |

OTHER PUBLICATIONS

K. Claypool, "Managing Schema Change in an Heterogeneous Environment," Worcester Polytechnic Institute, May 2002, pp. 1-413.

S. Scherzinger, et al., "Managing Schema Evolution in NoSQL Data Stores," Proceedings of the 14th International Symposium on Database Programming Languages, Aug. 2, 2013, pp. 1-10.

Ju Wei Shi et al., Pending U.S. Appl. No. 14/956,808 entitled "Record Schemas Identification in Non-Relational Database," filed with the U.S. Patent and Trademark Office Dec. 2, 2015.

List of IBM Patents or Patent Applictions Treated as Related; (Appendix P), Filed Jan. 29, 2016, 2 pages.

* cited by examiner

RECORD SCHEMAS IDENTIFICATION IN NON-RELATIONAL DATABASE

FOREIGN PRIORITY

This application claims priority to Chinese Patent Application No. 201410429768.0, filed Aug. 28, 2014, and all the benefits accruing therefrom under 35 U.S.C. § 119, the contents of which in its entirety are herein incorporated by reference.

TECHNICAL FIELD

The present invention relates to the field of database. More specifically, it relates to a method and device for identifying record schemas in a non-relational database.

BACKGROUND

Databases are a very important in modern information technology. Relational database systems are widely applied for storing and retrieving a variety of information. However, with the occurrence of a huge amount of users, big data and the cloud computing, the relational database is no longer capable of meeting the needs of newly developed information technology. For example, a three-tier architecture used in the cloud computing and a dynamic scale-out in database are not suitable to adopt the relational database. For this matter, the industry proposes non-relational databases (NoSQL). The table in the relational database usually stores formatted data structure with same field composition of each record. Even if not every record needs all fields, the relational database will assign all the fields for each record. This structure of above causes the performance bottleneck of the relational database. In contrast, although the non-relational database also stores data in manner of key-value pair, it structure is not fixed, different records can have different fields, and each record may add or reduce some key-value pairs as required, which may decrease cost of time and space without being limited to a fixed structure. As for developers, with the use of non-relational database, application developing efficiency can be increased by more flexible data models, and more users and more data can be supported by better dynamical scaling, and users' needs for applications with high response speed can be better satisfied.

However, since the non-relational database has flexible data models (for example, sparse, evolutionary and not flatten) and no metadata catalogue, there lacks efficient metadata management for non-relational databases, so that the enforcement of the data models of non-relational databases is difficult to be guaranteed. In relational database, the schemas of records of each object type are the same. However, in non-relational database, schemas of different records of the same object type may be different. For example, 5000 records of an object type Drug in a non-relational database DrugStore may have 10,100, or more schemas, and the number of schemas may even increase if the number of records increases. Thus, in order to enforce and utilize the non-relational database, the schemas of records need to be identified to build a metadata repository. Currently, developers may manually build and use a design document to record and check data models. However, this manner is time-consuming, and not flexible or expansive.

SUMMARY

The aim of the invention is to provide a method and device for identifying isomorphic record schemas in a non-relational database with high efficiency.

According to one aspect of the invention, there is provided a method for identifying record schemas in a non-relational database, comprising: assigning a record to a schema bucket according to structural characteristics of the record; and identifying a record schema of the record within the schema bucket so that records with isomorphic record schemas in the non-relational database can be determined.

According to another aspect of the invention, there is provided a method for identifying record schemas of a non-relational database, comprising: encoding keys of the lowest level of a record according to a global codemap for the lowest level of the record, and sorting the keys of the lowest level that belong to different parent keys respectively; and performing following blocks iteratively from the level right above the lowest level to the highest level: updating key names of corresponding parent keys in the parent level of a children level according to the codes of the keys of the children level; and encoding the keys of the parent level based on the updated key names of the parent level according to a global codemap for the parent level, and sorting the keys of the parent level that belong to different parent keys respectively, wherein the record schema of the record is identified according to a code sequence formed by encoding and sorting the keys of the highest level.

According to still another aspect of the invention, there is provided a device for identifying record schemas in a non-relational database, comprising: a schema coarse division unit configured to assign a record to a schema bucket according to structural characteristics of the record; and a schema fine division unit, configured to identify a record schema of the record within the schema bucket so that records with isomorphic record schemas in the non-relational database can be determined.

According to still another aspect of the invention, there is provided a device for identifying record schemas in a non-relational database, comprising: a first encoding and sorting unit configured to encode keys of the lowest level of a record according to a global codemap for the lowest level of the record, and sort the keys of the lowest level that belong to different parent keys respectively; a key name updating unit configured to update key names of corresponding parent keys in the parent level of a children level according to the codes of the keys of the children level; a second encoding and sorting unit configured to encode the keys of the parent level based on the updated key names of the parent level according to a global codemap for the parent level, and sort the keys of the parent level that belong to different parent keys respectively; and an iterative processing unit configured to control the key name updating unit and the second encoding and sorting unit to perform process in order from the level right above the lowest level to the highest level, wherein the record schema of the record is identified according to a code sequence formed by encoding and sorting the keys of the highest level.

According to still another aspect of the invention, there is provided a computer program product, the computer program product comprising a storage medium that can be accessed by a computer and store instructions, the instructions being executed by the computer to perform blocks of the methods for identifying record schemas in non-relational database provided according to the above aspects of the invention.

The isomorphic record schemas in a non-relational database can be identified efficiently according to the invention, especially for those non-relational databases with huge amount of data and with data adding and updating. The invention can speed up building or updating the metadata repository of a non-relational database, so that the performance of the database can be improved.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
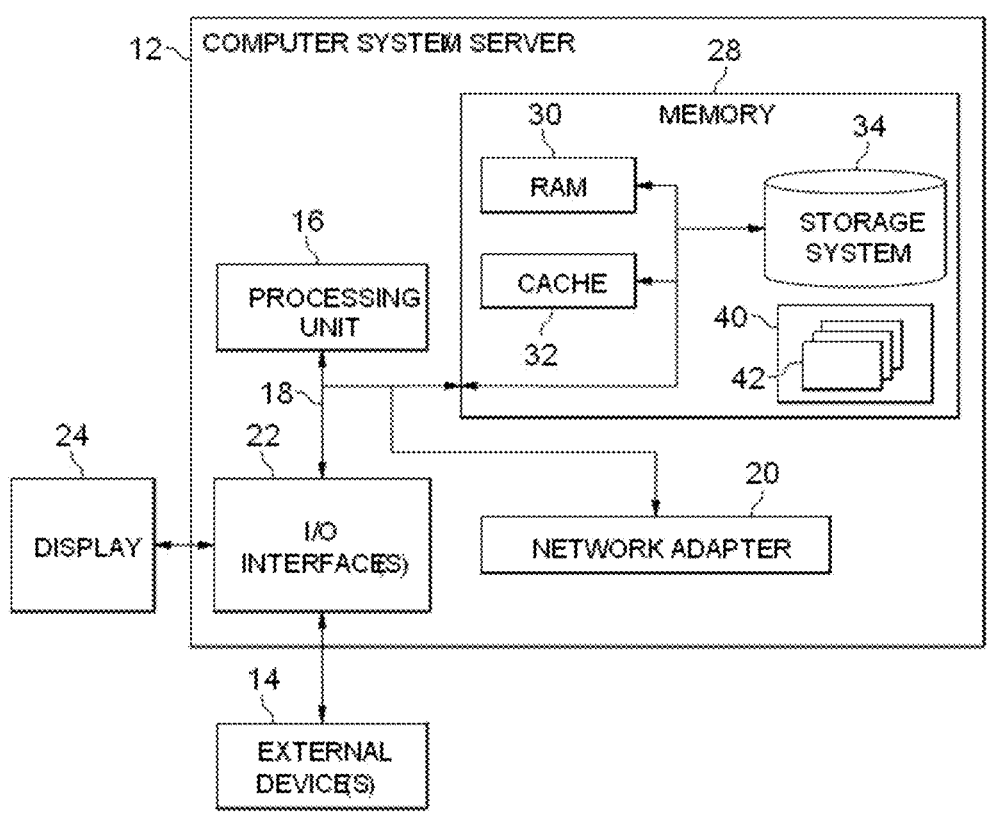
FIG. 1 shows an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the present disclosure, a non-relational database refers to any database comprising data (e.g., JSON/BSON data, Bibtex data, etc), with a "key-value pair" structure, such as MongoDB. Records in the non-relational database can also be referred to as data object instances in the non-relational database. One record is one object instance of an object type. The record is a structure of key-value pairs, which may include several key-value pairs. One key-value pair can be also called one field of a record. Key-value pairs can be delimited by a predefined delimiter. For example, different key-value pairs can be delimited by a comma or the like. Meanwhile, "key" and "value" in each key-value pair can be separated by a predefined separator. For example, they may be separated by a colon. Thus, a key in a key-value pair can be determined according to the separator. "Value" in a key-value pair can be a actual value, such as character string, a number value or the like, or can still be a structure of key-value pairs. Thus, records of a non-relational database may be of hierarchical structure. Besides, a predefined grouping symbol (for example, braces) can be used to distinguish multiple structures of key-value pairs, so that not only a plurality of records in a document can be identified, but also the structure of key-value pairs within one record can be identified.

Figure 2:
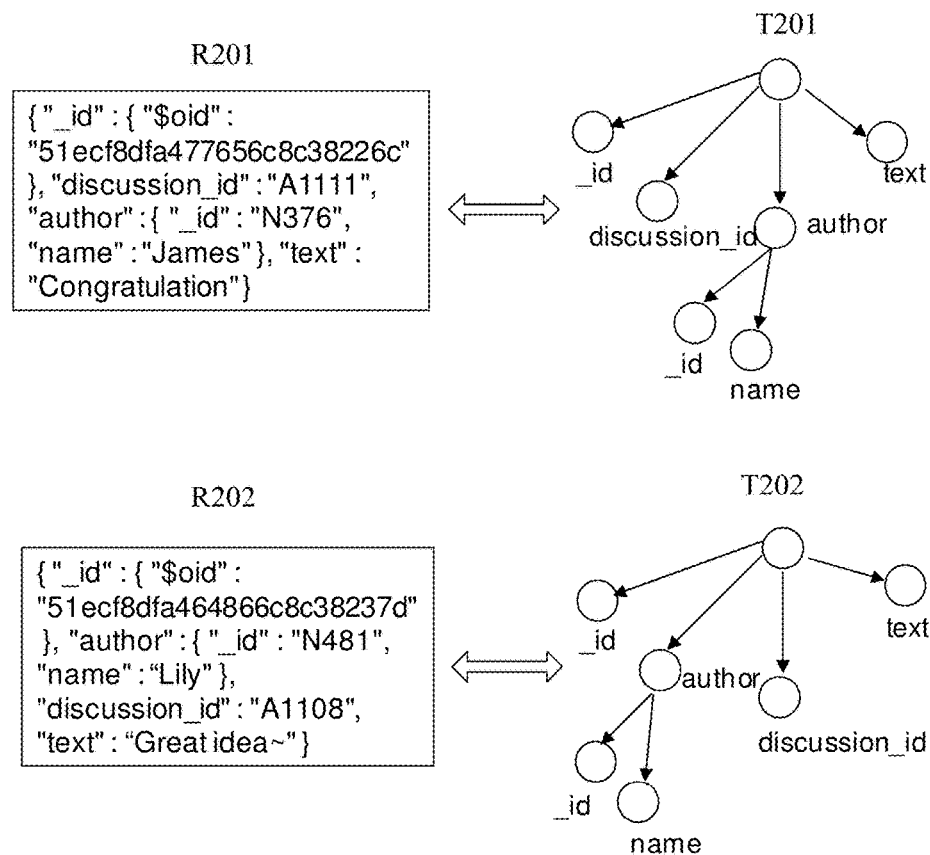
FIG. 2 schematically shows records in a non-relational database.

FIG. 2 schematically shows records in a non-relational database. FIG. 2 shows two exemplary records R201 and R202. The key-value pairs in the records R201 and R202 is surrounded by braces (grouping symbols), adjacent key-value pairs are delimited by comma (delimiter), and "key" and "value" are separated by colon (separator). Keys and values in each level of the records can be extracted by identifying these grouping symbols, delimiters and separators. According to the extracted keys and level information of the levels, the hierarchical structure information of this structure, that is, the schema of the record (also referred to as "record schema"), can be obtained. As shown in FIG. 2, the first level of the record 201 (also called "the highest level", which is the level formed by the key-value pairs within the most outside braces of the record) includes four key-value pairs, the keys of which are "_id", "discussion_id", "author", and "text", respectively. In addition, it can be seen that the values of the keys "_id" and "author" are still structures of key-value pairs. The value of the key "_id" includes one key-value pair, the key of which is "$oid". The value of the key "author" includes two key-value pairs, the keys of which are "_id" and "name", respectively. They form the second level of the record together with "$oid". The above hierarchical structure of the record R201 can be represented by a tree structure, as shown by the tree T201 in FIG. 2. The tree T201 has a virtual root node, under which there are four child nodes corresponding to four key-value pairs of the first level of the record T201, and the key names of these four key-value pairs label these four child nodes, which are the first level child nodes. A second level child node "$oid" is under the first level child nodes "_id", and two second level child nodes "_id" and "name" are under the second level child node "author". The second level child node "$oid", "_id", and "name" correspond to three second level key-value pairs of the record R201. Thus, the hierarchical structure of the record R201 can be represented by the tree T201. Generally, the method of constructing a corresponding tree structure according to a record can be: generating nodes (first level nodes) corresponding to key-value pairs of the highest level (first level) of the record on the first level under the virtual root of the tree, generating child nodes (second level nodes) that belong to the first level nodes of the tree according to the second level key-value pairs embodied in the first level key-values, and continuing the above processes until nodes corresponding to all key-value pairs of the record are built in the tree. In a non-relational database, extracting a record schema of a record is to determine the hierarchical structure of key-value pairs of the record. Said hierarchical structure can be represented by the above tree structure or any other manners which can indicate the hierarchical structure. It should be noted that, a record schema of a non-relational database may also only have one level, which means that the values of the first level key-value pairs no longer comprise further structures of key-value pairs. This case also falls in the meaning of the hierarchical structure described herein.

In order to better build and utilize a non-relational database, all record schemas of the non-relational database should be extracted and stored in a metadata repository. According to the above, the record schema of each record can be extracted by group symbols, delimiters and separators in the record. However, if the record schema of every record is stored in the metadata repository, redundancy shall occur and the storage space will be wasted because some record schemas are the same or essentially the same. In this disclosure, the record schemas being the same or essentially the same are referred to as isomorphic record schemas. The record schemas being isomorphic means that the number and the structure of the key-value pairs which are values of the same key-value pair are the same, but the order of the key-value pairs can be different. Herein, the structures of the key-value pairs being the same means that the key names of the key-value pairs are the same and corresponding values have the same data structure. In other words, if the key-value pairs as the values of the same key-value pairs in two record schemas are exactly the same after being sorted with the same rule, then these two record schemas are isomorphic. If record schemas (hierarchical structures) are constructed as rooted and labeled trees with the above method (such as tree T201), then if two trees corresponding to two record schemas are isomorphic, the two record schema are isomorphic. Two rooted and labeled trees being isomorphic means that the two trees become the same tree after child nodes under every parent node of these two trees are sorted with the same rule. For example, the record schema of the record R202 shown in FIG. 2 can be constructed as the tree T202, which has a root node (a virtual root node) and every node except the root node is labeled by corresponding keys of the record R202; therefore, the tree T202 can be also called a rooted and labeled tree. Of course, the root node here may also be labeled with an identifier of the record. However, the root node may not be labeled for this disclosure. The tree T201 and the tree T202 are the same except for the order of the first level nodes "author" and "discussion_id". According to the definition of isomorphic trees, the child nodes under every parent node of the tree T201 and tree T202 are sorted with the same rule, for example according to alphabet. Four nodes of the first level of the tree T201 and tree T202 are sorted for example according to alphabet (other characters can be arranged before or after letters) since they belong to the child nodes of the root node. After the sorting, the first level nodes of the tree T201 and tree T202 become exactly the same, which are "_id", "author", "discussion_id", and "text" in order. Then, the two child nodes "_id" and "name" under the parent node "author" are sorted, and the order of the two nodes remains the same after sorting. Now, the sorting of all child nodes under all parent nodes is completed. The tree T201 and the tree T202 become exactly the same after the above sorting, so they are isomorphic. Therefore, the record schemas of the record R201 and the record R202 corresponding to the trees are also isomorphic. It should be noted that, the same rule described herein means that the child nodes under the same parent node should use the same rule, but the child nodes under different parent nodes may use different rules to sort respectively.

Since isomorphic record schemas are the same or essentially the same, they can be stored only once to save storage space. Thus, building a metadata repository of a non-relational database should comprise the process of identifying isomorphic record schemas. Specifically, the procedure of building the metadata repository may comprise record schema extraction, isomorphic record schema identification, and record schema storage. The record schema extraction can be performed through grouping symbols, delimiters, separators and the like in the records as described in the above. When the record schema of a record is extracted, whether an isomorphic schema of this record schema exists in the metadata repository is determined by the isomorphic record schema identification, in order to determine whether to store this record schema. When the record schema of a record is identified to be isomorphic with a certain record schema in the metadata repository, this record schema may not be stored; when the record schema is identified to be not isomorphic with any record schema in the metadata repository, this record schema is stored to update the metadata repository. The method for identifying record schemas according to the disclosure will be illustrated by embodiments below.

Figure 3:
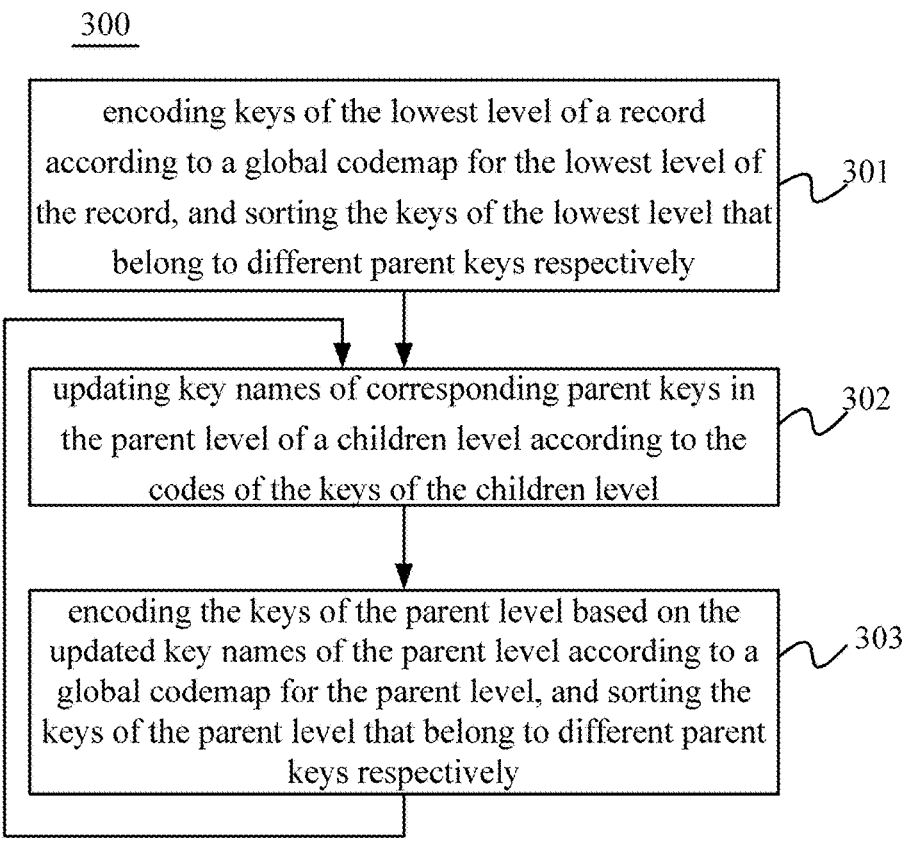
FIG. 3 shows a method for identifying record schemas in a non-relational database according to a first embodiment of the disclosure.

FIG. 3 shows a method 300 for identifying record schemas in a non-relational database according to a first embodiment of the disclosure.

As shown at block 301, keys of the lowest level of a record are encoded according to a global codemap for the lowest level of the record, and the keys of the lowest level that belong to different parent keys are sorted respectively. According to this embodiment, one or more global codemaps can be kept for the non-relational database whose metadata repository is to be built. The global codemap stores the mapping relationship between key names of keys of records in this relational database and corresponding codes level-wise. "Code" used for encoding can have a data type such number, character, string or the like. "Storing level-wise" herein means that: one codemap is kept independently for each level, codemaps for different levels are independent of each other, and different levels may adopt same or different code manners. Herein, the level of a record refers to the corresponding level of a tree when the record is transformed into the tree structure as described above. Down from the root node, the level on which the children nodes of the root node are located is called the first level or the highest level; the level on which the children nodes of the first level nodes are located is called the second level; the level on which the children nodes of the second level nodes are located is called the third level; and so on until the lowest level. The lowest level means that all nodes in this level have no children nodes, that is, all nodes of the lowest level are leaf levels. Herein, "global" means that the same codemap will be used for the same level of all records to be processed, that is, the first level of all records uses a global codemap for the first level, the second level of all records uses a global codemap for the second level, and so on. Thus, as shown at block 301, when the global codemap for the lowest level of the record are to be determined, which level the lowest level of the record to be processed is should be first determined, and then the global codemap for the corresponding level will be looked up. For example, if the lowest level of a certain record is the first level, the global codemap for the first level will be used; if the lowest level of a certain record is the second level, the global codemap for the second level will be used. The codemap herein may be preset, that is, the codemap for all possible levels and their keys has been saved in the system before the process. However, the codemap can also be a codemap with dynamic update. When some level of a new record is being processed, the codemap can be updated according to the keys of this level of the new record. In other words, when some key of this level of the new record is not in the global codemap for the corresponding level, an item for encoding this key can be added in the global codemap. In this case, the system may not set an initial codemap at start, or may set a simple initial codemap. In this way, the method for identifying isomorphic record schemas according to the disclosure will be more flexible and expansive. Since the mapping between the key names of keys in corresponding levels and the corresponding codes is recorded in the codemap, the keys of the lowest level can be encoded according to a mapping table for the lowest level. After the lowest level has been encoded, it can be sorted. According to the definition of isomorphic trees, the nodes under different parent nodes should be sorted respectively. Accordingly, keys that belong to different parent keys should be sorted respectively for records. Herein, the parent-children relationship between two keys corresponds to the parent-children relationship between the tree nodes corresponding to the two keys. The specific rule for sorting can be set arbitrarily as required, as long as all records are applied with the same rule. For example, the sorting can be based on numeral order or alphabet of the code of the key.

Figure 4:
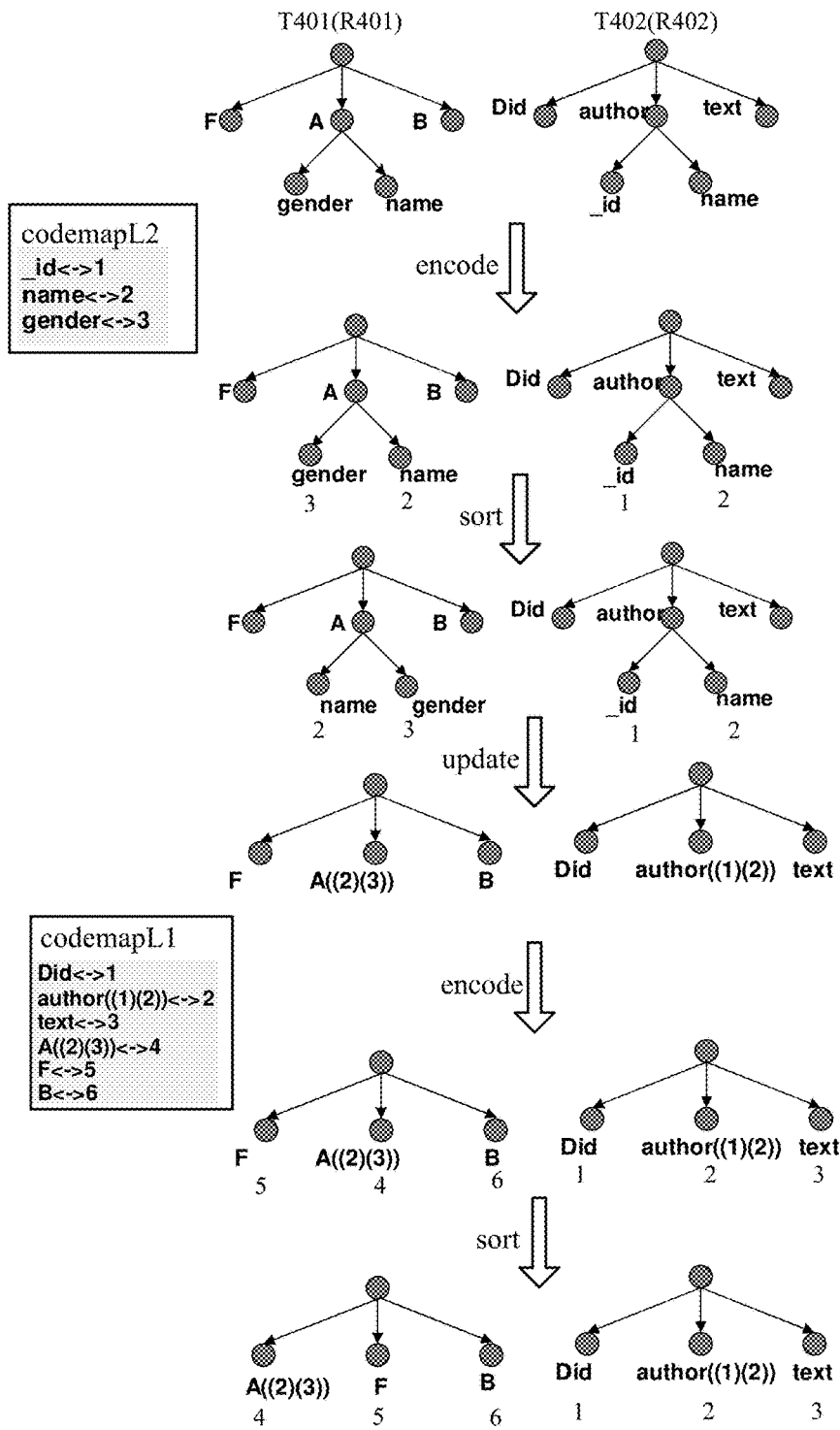
FIG. 4 shows exemplary identifying processes for illustrating the method for identifying record schemas in a non-relational database according to the first embodiment of the disclosure.

FIG. 4 shows exemplary identifying processes for illustrating a method for identifying record schemas in a non-relational database according to the first embodiment of the disclosure. FIG. 4 exemplarily shows the identifying processes for two records R401 and R402. It should be noted that the schemas of the two records have been illustrated by tree structures (tree T401 and T402) for clarity. The lowest levels of the records R401 and R402 are both the second level, and the global codemap for the second level is codemap L2. The codemap L2 stores the mappings between the key names and the codes for all keys in the second levels, wherein "_id" corresponds to code "1", "name" corresponds to code "2", "gender" corresponds to code "3". After the nodes of the second level have been encoded, the nodes (keys) of the second level that belong to the same parent node (parent key) will be sorted. For the record R401, keys "name" and "gender" of the second level belong to the same parent key "A", therefore they are sorted. After sorting, the key "name" is located before the key "gender" since the code "2" corresponding to the key "name" is smaller than the code "3" corresponding to the key "gender". For the record R402, keys "_id" and "name" of the second level belong to the same parent key "author". After sorting, the key "_id" is still located before the key "name" since the code "1" corresponding to the key "_id" is smaller than the code "2" corresponding to the key "name". Obviously, those skilled in the art may adopt other sorting rules, for example codes with greater value being ranked before codes with smaller value.

After the coding and the sorting for the lowest level are completed, levels above the lowest level will be encoded and sorted sequentially, that is, iteratively performing the steps illustrated in blocks 302 and 303 from the level (parent level) right above the lowest level to the highest level. However, before encoding and sorting the levels above the lowest level, key names of corresponding parent keys in the higher level should be updated according to the codes of the keys of the lower level, in order to reflect the structure of key-value pairs of the lower level in key names of the higher level. As shown in block 302, key names of corresponding parent keys in the parent level of a children level are updated according to the codes of the keys of the children level. Herein, the relationship between the parent level and the children level is the relationship between the higher level and the lower level. For example, the first level is the parent level of the second level, and the second level is the children level of the first level. After the keys of the children level (e.g. the lowest level) is encoded and sorted, a parent key (i.e., corresponding parent keys of the parent level) of those keys is updated based on the codes of all children keys of this parent keys to reflect the children keys comprised by this parent key. For example, the updated key name can be formed of the original key name of the parent key together with a code sequence formed by sorting all the child keys of the parent key as described in the above. In the example of FIG. 4, for the record R401, the key name of the key "A" in the first level (the parent level of the lowest level) is updated to "A((2)(3))" based on the codes "2" and "3" of its children keys. For the record R402, the key name of the key "author" in the first level is updated to "A((1)(2))" based on the codes "1" and "2" of its children keys. It should be noted that the method for updating the key names in FIG. 4 is merely an example and it suffices that the updated key names can distinguish the keys having different structures in this level, wherein the keys having different structures include keys having different key names and/or keys with different children keys.

After the key names of the keys of the above parent level, as shown in block 303, keys of the parent level are encoded based on the updated key names of the parent level according to a global codemap for the parent level, and the keys of the parent level that belong to different parent keys are sorted respectively. The specific manner of the encoding and sorting performed in block 303 may be similar to block 301, the description of which is omitted. For example, in the example of FIG. 4, the parent level here is the first level, and the corresponding global codemap is codemap L1. The nodes of the first level of the record R401 are encoded and sorted as codes "4", "5", and "6", and the nodes of the first level of the record R402 are encoded and sorted as code "1", "2", and "3". It should be noted that, since the first level is the highest level, the keys of the first level actually have no parent keys. However, all keys of the first level are considered as the children keys of the same virtual root key (corresponding to the virtual root node).

In the example of FIG. 4, since both records only have two levels, blocks 302 and 303 are only performed once. However, if the record to be processed has more than two levels, the steps illustrated in blocks 302 and 303 should be performed iteratively from the parent level of the lowest level till the highest level (i.e. the first level) of the record. After the highest level of the record is encoded and sorted, the resulting codes can form a code sequence, which can identify a group of isomorphic record schemas uniquely. That is, if two record schemas are isomorphic, the code sequences obtained must be the same, and if the code sequences obtained are not the same, the record schemas of two records are not isomorphic. In other words, the record schema of the record can be identified according to a code sequence formed by encoding and sorting the keys of the highest level, so that isomorphic record schemas can be identified with the same identifier. For example, in the example of FIG. 4, the code sequence for identifying the record schema of the record R401 is "456" and the code sequence for identifying the record schemas of the record R402 is "123"; therefore, they do not belong to isomorphic record schemas. It should be noted that, the "the record schema of the record is identified according to a code sequence formed by encoding and sorting the keys of the highest level" herein does not mean that such a code sequence has to be used as the identifier of the record schema, rather the code sequence can be further encoded into another identifier (for example, a simpler numeral identifier) as the identifier of the record schema, which also falls in the scope of the disclosure. For example, the code sequence "456" can be further encoded into "2" as the identifier of the record schema, and the code sequence "123" can be further encoded into "1" as the identifier of the record schema.

In one embodiment, the hierarchical structure is reflected from the lowest level to the highest level by using the codes of the children keys to update the key names of the parent keys, and each level is encoded with a global codemap, so that isomorphic record schemas can be uniquely identified with simple codes of the highest level. According to the first embodiment of the disclosure, when determining whether the record schema of a record has an isomorphic record schema, only the steps shown in blocks 301 to 303 need to be performed for the recode, and whether the code sequence (or an identifier obtained by encoding the code sequence) exists needs to be determined. If the code sequence exists, an isomorphic record schema has existed for the record; otherwise no isomorphic record schema has existed and the record schema of the record should be stored in the metadata repository. In this way, when identifying isomorphic record schemas in a non-relational database, it is not necessary to compare all records in the non-relational database pair-wise. Instead, it only needs to obtain an identifier according to the above-described method, and simply determine if the identifier already exists. This can reduce identification time and save computing resources greatly in particular for databases with enormous amount of data. In addition, as described in the background, the non-relational database is expansive, and the data therein would be updated continuously. Thus, as for determining isomorphic schemas for newly added records in the non-relational database, efficiency can be increased dramatically by using the first embodiment of the disclosure, because it only needs to obtain an identifier for the schema of the new added record according to the above method, without comparing the new added record with all existing records pair-wise. Therefore, according to the first embodiment of the disclosure, the isomorphic record schemas in a non-relational database can be identified efficiently, and thus the metadata repository can be built efficiently, avoiding wasting computing resources and storage space.

Further, in the embodiment, optionally, before encoding each level of the record, the codemap for the level to be encoded can be updated according to the key names in the level to be encoded. In other words, when some key of some level of the record does not exist in the global codemap for the corresponding level, the item for encoding the key can be added in the global codemap. As such, the method for identifying isomorphic record schemas according to the embodiment will be more flexible and expansive. In addition, in this disclosure, the codemaps for different levels can be kept in one file or different files.

Figure 5:
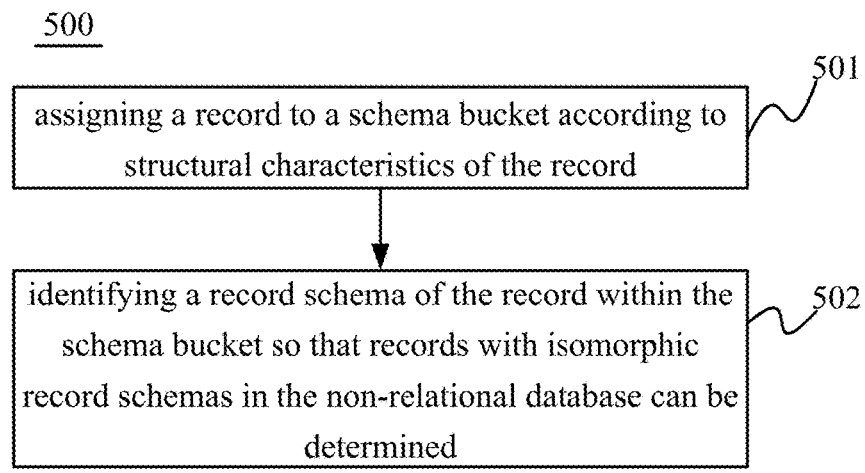
FIG. 5 shows a method for identifying record schemas in a non-relational database according to a second embodiment of the disclosure.

FIG. 5 shows a method 500 for identifying record schemas in a non-relational database according to a second embodiment of the disclosure. In the second embodiment, coarse division is first performed on schemas of records by means of structural characteristics of the records, and then the record schemas of the records are further identified within the coarsely divided schema groups (also referred to as schema buckets). As shown at block 501, a record is assigned to a schema bucket according to structural characteristics of the record. Herein, the structural characteristics of the record can be for example a least one of total key number, total level number, and key number in each level of the record (corresponding to at least one of total node number, total level number, and node number in each level of a corresponding tree structure), or the like, as long as the characteristics can reflect the difference between the schema of one record and other schemas. When the above-described structural characteristics of two records are different, the schemas of the two records are definitely not isomorphic record schemas. Therefore, it is not necessary to further determine if the schemas of these two records are isomorphic. In other words, whether the schemas of the records are isomorphic can be determined only among records with the same structural characteristics.

Figure 6:
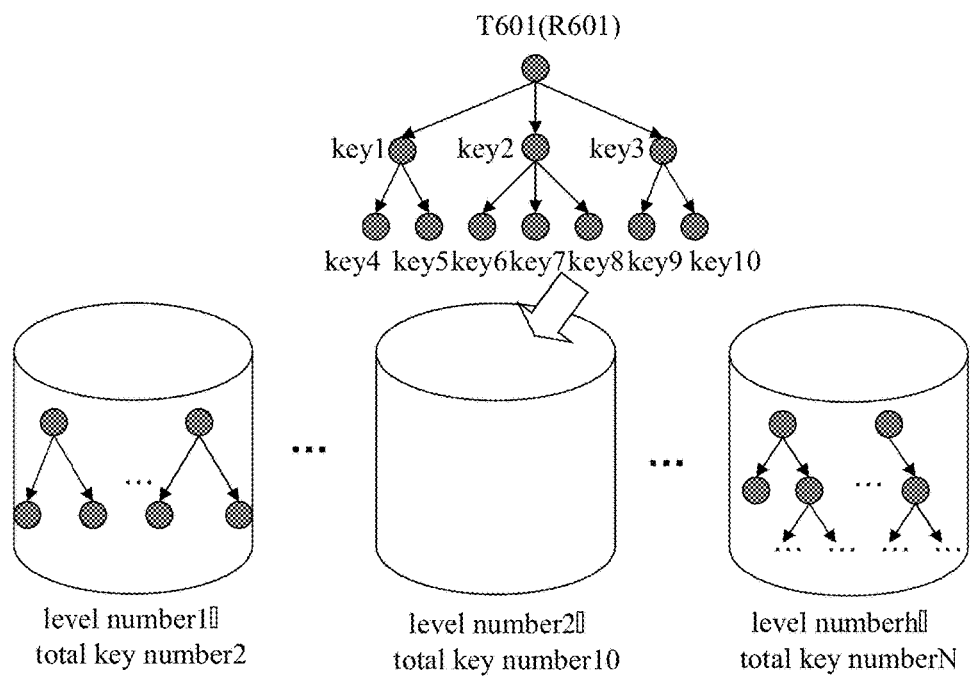
FIG. 6 shows a schematic diagram for coarsely dividing schemas of records according to structural characteristics of the records.

FIG. 6 shows an illustrative diagram of coarsely dividing schemas of records according to structural characteristics of the records. In the example of FIG. 6, the total level number and the total key number (corresponding to the total level number and the total node number of the tree structure) are selected as the structural characteristics herein. It should be noted that, the virtual root node of the tree structure is not counted as part of the total level number and the total node number. Alternatively, it can be counted, as long as the same rule is applied to all records. The record R601 shown in FIG. 6 has 10 keys and 2 levels (FIG. 6 only shows the corresponding tree structure T601 of the record R601); therefore, it is assigned to a schema bucket with 2 levels and 10 keys. After the record is assigned to the corresponding schema bucket, the record schema of the record is identified within the schema bucket, so that records with isomorphic record schemas in the non-relational database can be determined, as shown in block 502. The specific method for identifying record schemas in block 502 can adopt any existing or potential identification method for determining isomorphic record schemas. With the inspiration of the embodiment, those skilled in the art can easily apply other identification methods for determining isomorphic record schemas to this embodiment. The implementation of block 502 will be described by way of examples in the following. However, as for the second embodiment, the implementation of block 502 is not limiting the scope thereof.

In the second embodiment, performing coarse division on the records firstly can reduce the computing complexity of isomorphic schema identification greatly. Especially, when the number of records or the total key number that should be considered is huge, performing isomorphic schema identification directly costs a great amount of computing resource. However, performing coarse division on the records firstly may greatly reduce the number of records or the key number that need to be considered when actually identifying isomorphic schemas, so that the cost for computing resources can be reduced.

Figure 7:
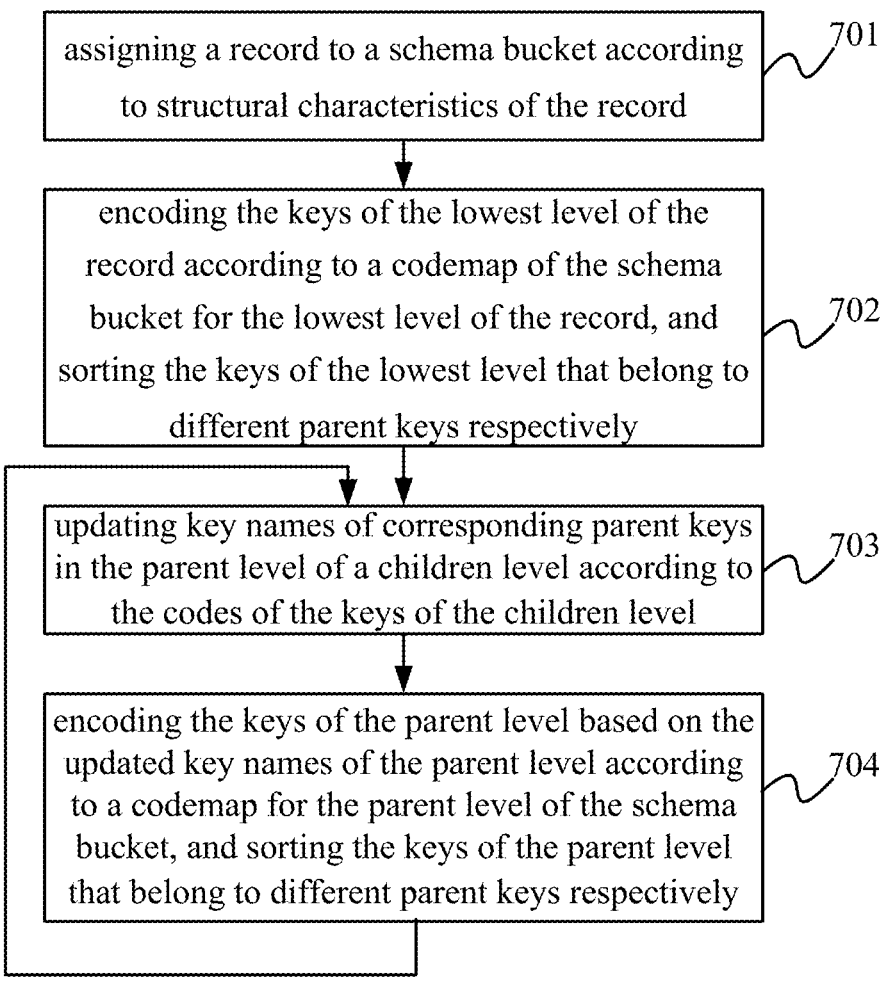
FIG. 7 shows a method for identifying record schemas in a non-relational database according to a first example of the second embodiment of the disclosure.

FIG. 7 shows a method 700 for identifying record schemas in a non-relational database according to a first example of the second embodiment of the disclosure. Block 701 of the method 700 is the same as block 501 of FIG. 5. Blocks 702 to 704 of the method 700 are one implementation of block 502 of FIG. 5, and adopt a method that is similar to the first embodiment. Specifically, in Block 701, a record is assigned to a schema bucket according to the structural characteristics of the record. In Block 702, the keys of the lowest level of the record are encoded according to a codemap of the schema bucket for the lowest level of the record, and the keys of the lowest level that belong to different parent keys are sorted respectively. Blocks 703 and 704 are performed iteratively from the level right above the lowest level to the highest level. In Block 703, key names of corresponding parent keys in the parent level of a children level are updated according to the codes of the keys of the children level. In Block 704, the keys of the parent level are encoded based on the updated key names of the parent level according to a codemap for the parent level of the schema bucket, and the keys of the parent level that belong to different parent keys are sorted respectively. The above Blocks 702-704 are similar to Blocks 301 to 303 in the first embodiment, the description of which can also be applied herein. The difference between them only lies in that, in the example of the second embodiment, each codemap is no longer a global codemap but a codemap of a certain schema bucket. Herein, a codemap for a certain level of a certain schema bucket refers to a codemap applicable to the certain level of all records needing isomorphic schema identification within the certain schema bucket. However, the codemaps of different schema buckets are independent, and they may use same or different code methods. For example, even if the code for the key "_id" in the first level of the first schema bucket is "1", the code for the key "_id" in the first level of the second schema bucket may not be "1", while the code for another key of the first level of the second schema bucket may be "1". Thus, the codemap for coding and sorting in the second embodiment is smaller than the global codemap in the first embodiment, so that the consumption of computing resources may be reduced. For example, when radix sort is adopted, the computing complexity is $O(|s|)$, wherein s is the adopted radix (i.e., the key number in the codemap). If the key number in the codemap is large, the computing complexity will be large. Especially, when the key number in the codemap is larger than $v \log v$ (v is the number of keys to be sorted), the radix sort has no advantage over other fast sorting methods. Since the key number of the codemap for a schema bucket is smaller than the global codemap, the computing complexity of the second embodiment is smaller.

The codemap for a schema bucket in this example can be preset or dynamically updated. Preferably, before performing encoding on each level of the record, the codemap for the level to be encoded is updated according to the key names in the level to be encoded. Similar to the first embodiment, according to the first example of the second embodiment, when identifying isomorphic record schemas in a non-relational database, it is not necessary to compare all records in the non-relational database pair-wise. Instead, it only needs to obtain an identifier according to the above-described method, and simply determine if the identifier already exists. Therefore, the first example of the second embodiment can also identify isomorphic record schemas in a non-relational database efficiently, establish the metadata repository efficiently, and avoid waste of computing resources and storage space. In addition, as described above, since the global codemap is replaced by the codemap specific to a schema bucket in the first example of the second embodiment, the consumption of computing resources can be further reduced.

In the first example of the second embodiment, a code sequence can also be obtained after the highest level is encoded and sorted according to the codemap of the schema bucket. However, since the codemap in the first example is a codemap for a certain schema bucket instead of a global codemap, the same code sequence might occur in different schema buckets. Therefore, the above code sequence cannot uniquely determine a group of isomorphic record schemas. In the first example of the second embodiment, the record schema of the record is identified by the above code sequence together with an identifier of the schema bucket. The code sequence and the identifier of the schema bucket can identify a group of isomorphic record schemas uniquely. Therefore, the record schema of the record being identified according to a code sequence formed by encoding and sorting keys of the highest level together with an identifier of the schema bucket can uniquely identify the isomorphic record schema of the record. Similar to the first embodiment, "identifying the record schema of the record according to the code sequence together with the identifier of the schema bucket" does not mean that the identifier of the record schema has to take the form of the code sequence concatenating the identifier of the schema bucket. It is also possible to encode the code sequence and the identifier of the schema bucket together into another identifier as the identifier of the isomorphic record schema.

Figure 8:
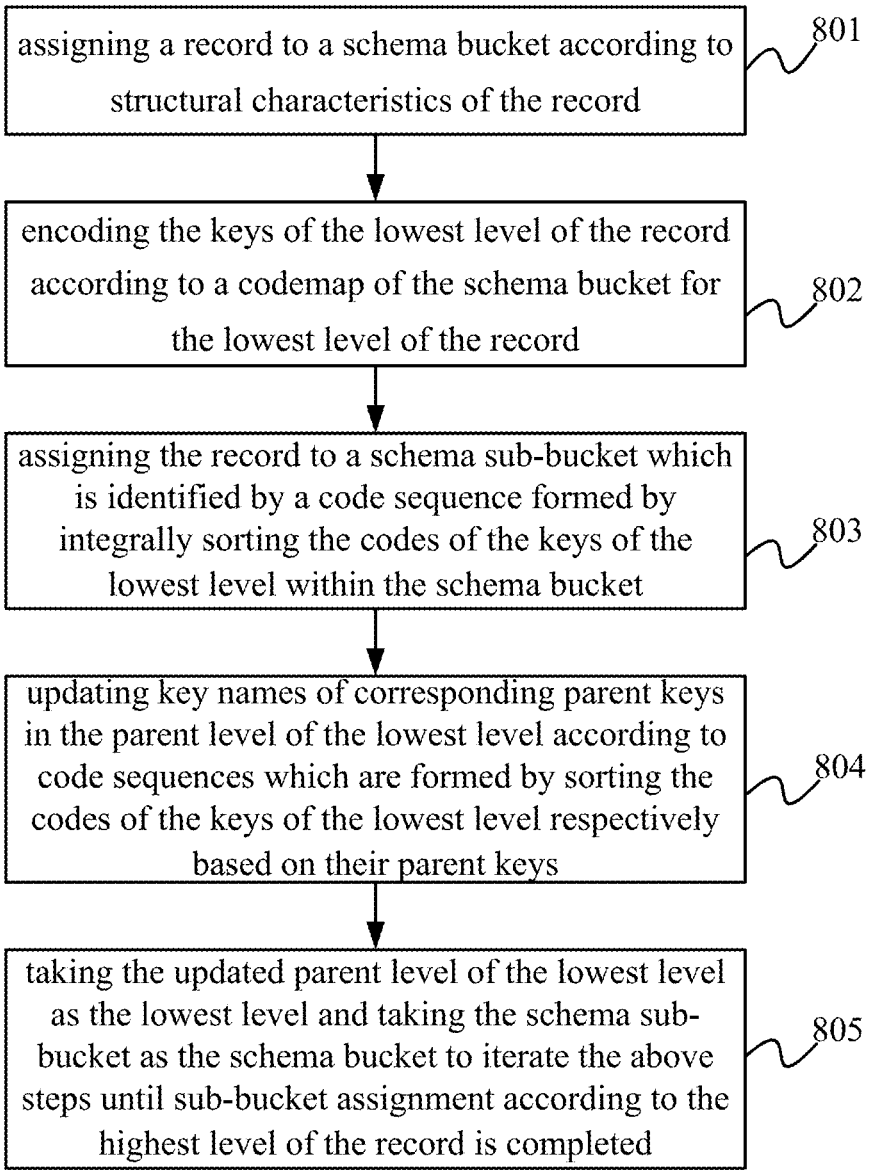
FIG. 8 shows a method for identifying record schemas in a non-relational database according to a second example of the second embodiment of the disclosure.
Figure 9:
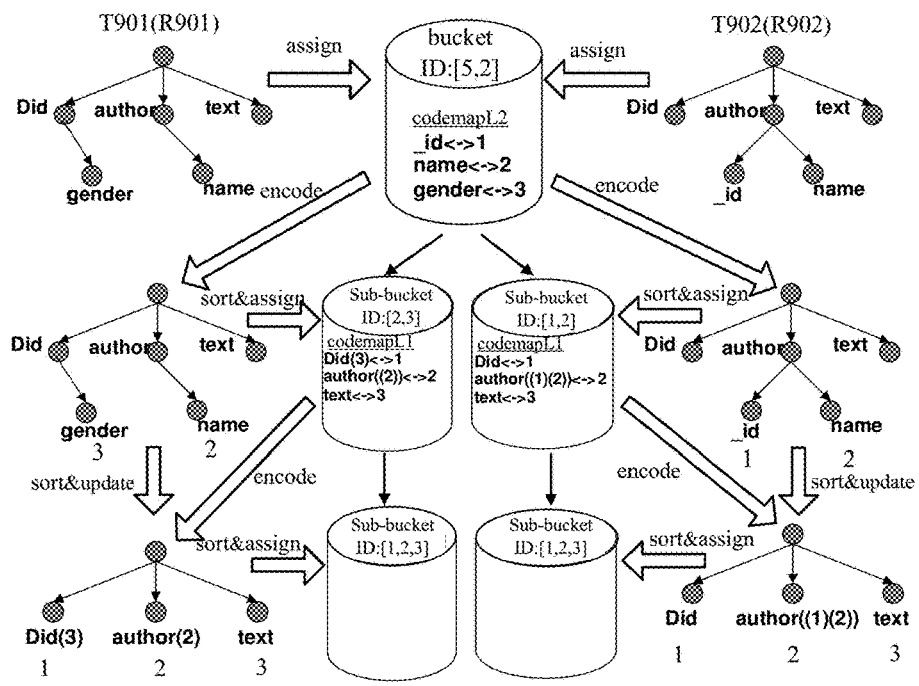
FIG. 9 shows exemplary identifying processes for illustrating the method for identifying record schemas in a non-relational database according to the second example of the second embodiment of the disclosure.

FIG. 8 shows a method 800 for identifying record schemas in a non-relational database according to a second example of the second embodiment of the disclosure. Block 801 of the method 800 is the same as block 501 in FIG. 5. Blocks 802-805 describe how to identify the record schema of the record in the schema bucket in order to determine isomorphic record schemas. FIG. 9 shows exemplary identifying processes for illustrating the method for identifying record schemas in a non-relational database according to the second example of the second embodiment of the disclosure. Two records shown in FIG. 9 (records R901 and R902) are illustrated as tree structures (Tree T901 and T902).

As shown in block 801, a record is assigned to a schema bucket according to structural characteristics of the record. The records 8901 and 8902 in FIG. 9 both have 5 keys and 2 levels, and thus both are assigned to the schema bucket with the identifier (ID) being [5, 2]. As shown in block 802, the keys of the lowest level of the record are encoded according to a codemap of the schema bucket for the lowest level of the record. In FIG. 9, the codemap is the codemap L2 for the second level of the schema bucket [5, 2]. Thus, the keys of the second level are encoded as shown in the figure.

As shown in block 803, the record is assigned to a schema sub-bucket which is identified by a code sequence formed by integrally sorting the codes of the keys of the lowest level within the schema bucket. Herein, said integrally sorting the codes of the keys in the lowest level means sorting all keys in this level together, instead of sorting respectively based on parent keys. For example, the nodes "gender" and "name" in the second level of the tree R901 belong to different parent keys "Did" and "author" respectively; however, the keys "gender" and "name" are also sorted to form a code sequence to identify the schema bucket. In this way, it can make sure that records possibly with isomorphic schemas will be assigned to the same schema sub-bucket. It should be noted that, the "identifying" in block 803 does not necessarily mean to take the code sequence as the identifier of the schema sub-bucket, but only mean that the code sequence can be used to determine the schema sub-bucket. The code sequence may also be further encoded into a simpler identifier to identify the schema sub-bucket. In the example of FIG. 9, the above code sequence of the record R901 is "23", thus it is assigned to a sub-bucket with identifier being [2, 3]. The above code sequence of the record R902 is "12", and it is assigned to a sub-bucket with identifier being [1, 2].

As shown in block 804, key names of corresponding parent keys in the parent level of the lowest level are updated according to code sequences which are formed by sorting the codes of the keys of the lowest level respectively based on their parent keys. Herein, similar to the first embodiment, the key name of a parent key is updated according to a code sequence obtained by encoding and sorting its children keys. Since updating a certain parent key only involves its own children keys, the sorting in block 804 is different from the sorting in block 803. The sorting in block 804 only sorts children keys under the same parent key while children keys under different parent keys are sorted respectively. No sorting will be performed between children keys under different parent keys. It is similar to sorting keys belong to different parent keys in the lowest level respectively in the first embodiment, the description of which will be omitted. In the example of FIG. 9, key names of the keys "Did" and "author" in the first level (the parent level of the lowest level) of the record R901 are updated to "Did(3)" and "author(2)", and the key name of the key "author" in the first level of the record R902 is updated to "author((1)(2))".

As shown in block 805, the updated parent level of the lowest level is taken as the lowest level and the schema sub-bucket is taken as the schema bucket to iterate the above blocks 802 to 804 until sub-bucket assignment according to the highest level of the record is completed. After the above blocks 802-804 are executed once, the parent level of the lowest level already contains the structure information of the lowest level. Thus, the parent level can be taken as a new lowest level to iterate blocks 802-804 till processes for the highest level are completed. In the iteration, the schema bucket should be replaced besides the level information. Since the record has been assigned to a schema sub-bucket after blocks 802-804 have been executed once, identification only needs to be performed within the schema sub-bucket when re-performing blocks 802-804. Specifically, a codemap specific to the schema sub-bucket can be directly used for encoding when re-performing blocks 802-804. The codemap specific to the schema sub-bucket means that the codemap is independent with any codemap for records that do not belong to the schema sub-bucket.

In the example of FIG. 9, the first level (the parent level of the lowest level) is taken as the lowest level, and the sub-buckets [2, 3] and [1, 2] are taken as new schema buckets respectively to encoding the records R901 and R902. The codemap that the record R901 uses is the codemap [2, 3]-L1 of the sub-buckets [2, 3], and the codemap that the record R902 uses is the codemap [1, 2]-L1 of the sub-buckets [1, 2]. The codemap [2, 3]-L1 and the codemap [1, 2]-L1 show that they can use the same code for different key names since they are independent of each other. For example, the record R901 uses a code "1" for the key name "Did(3)", and the record R902 also uses the code "1" for a different key name "Did". After the keys of the first level have been encoded, they will be sorted and a further schema sub-bucket assignment will be performed (as shown in block 803). At this point, the record is assigned to a sub-bucket in the sub-bucket (which is taken as the schema bucket) when block 803 is executed for the first time. In the example of FIG. 9, the record R901 is assigned to the sub-bucket [1, 2, 3] in the sub-bucket [2, 3], and the record R902 is assigned to the sub-bucket [1, 2, 3] in the sub-bucket [1, 2]. Since the process for the highest level of both the records R901 and R902 has been completed now (that is, sub-bucket assignment according to the highest level of the record is completed), block 804 will no longer be processed. However, if it is not the highest level being processed now, the key names of the parent level of the current level should continue to be updated, and the above block 802-804 should continue to be performed by taking the parent level as a new lowest level till the process for the highest level is completed.

When the sub-bucket assignment according the highest level of the record is completed, the isomorphic schema of the record has been determined. The isomorphic schema of a certain record can be determined uniquely by the schema bucket and all schema sub-buckets to which the certain record has been assigned as described above. Thus, in order to determine the isomorphic record schema of the record, the record schema of the record can be identified by all the schema sub-buckets and the schema bucket to which the record is assigned. For example, the identifiers of all the schema sub-buckets and the schema bucket can be connected sequentially to identify the record schema.

In the example of FIG. 9, the schema of the record R901 can be identified as "5223123", and the schema of the record R902 can be identified as "5212123". Apparently, they are not isomorphic schemas. However, similar to other embodiments in the above, the record schema of the record being identified by all the schema sub-buckets and the schema bucket to which the record is assigned does not mean that the identifiers of all the schema sub-buckets and the schema bucket have to be connected to be as the identifier of the record schema. It is possible to further encode the identifiers of the schema sub-buckets and the schema bucket together into another identifier to identify the isomorphic record schema.

In addition, similar to the first example, the codemap for the schema bucket or for the schema sub-bucket can be preset or dynamically updated. Preferably, before performing decoding on each level of the record, the codemap for the level to be encoded will be updated according to the key names in the level to be encoded.

Similar to the first embodiment and the first example of the second embodiment, according to the second example of the second embodiment, when identifying isomorphic record schemas in a non-relational database, it is not necessary to compare all records in the non-relational database pair-wise. Instead, it only needs to obtain an identifier according to the above-described method, and simply determine if the identifier already exists. Therefore, the second example of the second embodiment can also identify isomorphic record schemas in a non-relational database efficiently, establish the metadata repository efficiently, and avoid waste of computing resources and storage space. In addition, in the second example of the second embodiment, the record is assigned to finer and finer schema sub-buckets level by level, which further reduces the codemap for coding and sorting, so that computing resources can be further reduced. For example, when a radix sort is adopted, the computing complexity is O(|s|). Since this example adopts smaller codemaps, the computing complexity is lower.

Figure 10:
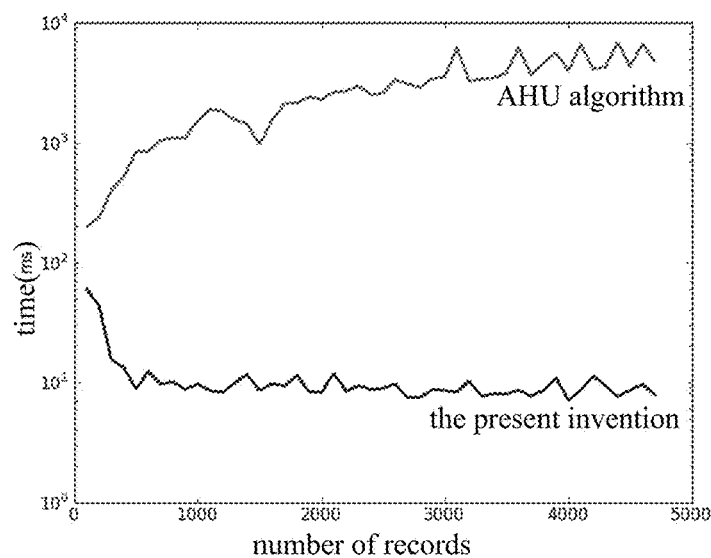
FIG. 10 shows a performance diagram of identifying the record schemas in an exemplary non-relational database with the method according to the second example of the second embodiment of the disclosure.

FIG. 10 shows a performance diagram of identifying the isomorphic record schemas in an exemplary non-relational database Drugbank with the method of the second example of the second embodiment of the disclosure. FIG. 10 also shows the performance of identifying the isomorphic record schemas in the same non-relational database Drugbank by an AHU algorithm (A. V. Aho and J. E. Hoperoft, "Design & Analysis of Computer Algorithms", Pearson Education India, 1974) for determining isomorphic trees. The horizontal axis in FIG. 10 is the number of records in the Drugbank database, and the vertical axis is the time for determining the isomorphic schemas of the records (the time shown in FIG. 10 is the time for 100 records because the time for a single record is too short). The curve on the upper of FIG. 10 is the performance of AHU, and the curve on the lower is the performance of the present invention. According to FIG. 10, when the number of records is small at the beginning, the difference between the two curves is small. However, with the growing of the number of records, the difference becomes greater. When the number of records is 40000, the method of the present invention is 3 orders faster than the AHU algorithm. The AHU algorithm adopts a manner of comparing trees (records) pair-wise to determine their isomorphism. Thus, with the growing of the number of data, the time for determining each record keeps growing. However, the method of the present invention does not need to compare the records pair-wise, but only need to identify an identifier for the record schemas of the records. Thus, the time for determining the isomorphic schema of a single record does not increase with the growing of the number of records.

In FIG. 10, the method of the present invention costs more time at the beginning for the necessity of building and updating corresponding codemaps. Later with the codemaps becoming stable, the cost time decreases and stabilizes. The amount of data in current databases is enormous, usually in order of millions or even more, and the data in the databases keeps growing and updating. In this case, the advantage of the present invention is obvious.

Figure 11:
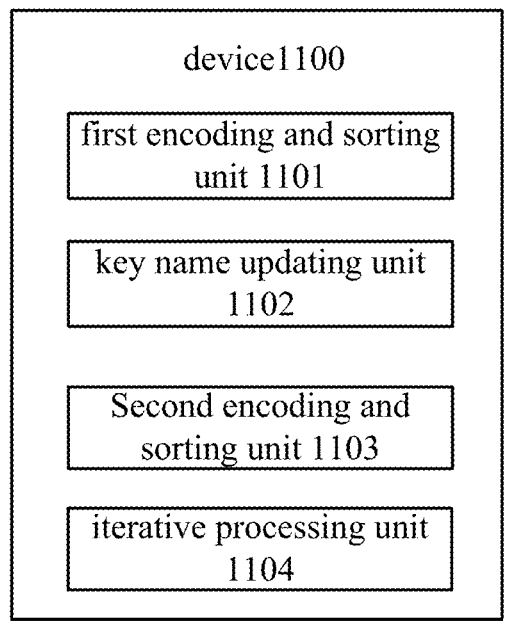
FIG. 11 schematically shows a block diagram of a device for identifying record schemas in a non-relational database according to a third embodiment of the disclosure.

FIG. 11 illustratively shows a block diagram of a device 1100 for identifying record schemas in a non-relational database according to a third embodiment of the disclosure. The device 1100 comprises: a first encoding and sorting unit 1101 configured to encode keys of the lowest level of a record according to a global codemap for the lowest level of the record, and sort the keys of the lowest level that belong to different parent keys respectively; a key name updating unit 1102 configured to update key names of corresponding parent keys in the parent level of a children level according to the codes of the keys of the children level; a second encoding and sorting unit 1103 configured to encode the keys of the parent level based on the updated key names of the parent level according to a global codemap for the parent level, and sort the keys of the parent level that belong to different parent keys respectively; and an iterative processing unit 1104 configured to control the key name updating unit and the second encoding and sorting unit to perform process in order from the level right above the lowest level to the highest level. Here, the record schema of the record is identified according to a code sequence formed by encoding and sorting the keys of the highest level.

The details for the method of identifying isomorphic record schemas in a non-relational database in the first embodiment also apply to the device 1100, the detailed description of which will be omitted. According to one embodiment, the first encoding and sorting unit 1101, the key name updating unit 1102, the second encoding and sorting unit 1103 and the iterative processing unit 1104 described above can be implemented by a combination of a computer similar to the computer system/server 12 described in FIG. 1 and software, and those modules does not have to be separated as different modules, but the whole or part of their functions can be implemented in one module. Optionally, the first encoding and sorting unit 1101 and/or the second encoding and sorting unit 1103 can be further configured to update the codemap for a specific level according to key names of the specific level before the specific level of the record is encoded.

Figure 12:
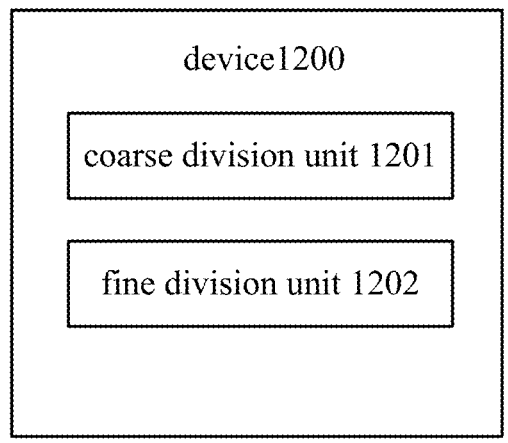
FIG. 12 schematically shows a block diagram of a device for identifying record schemas in a non-relational database according to a forth embodiment of the disclosure.

FIG. 12 shows a block diagram of a device 1200 for identifying record schemas in a non-relational database according to a forth embodiment of the disclosure. The device 1200 comprises: a schema coarse division unit 1201 configured to assign a record to a schema bucket according to structural characteristics of the record; and a schema fine division unit 1202 configured to identify a record schema of the record within the schema bucket so that records with isomorphic record schemas in the non-relational database can be determined.

The details for the method of identifying isomorphic record schemas in a non-relational database in the second embodiment also apply to the device 1200, the detailed description of which will be omitted. According to one embodiment, the schema coarse division unit 1201 and the schema fine division unit 1202 described above can be implemented by a combination of a computer similar to the computer system/server 12 described in FIG. 1 and software, and those modules does not have to be separated as different modules, but the whole or part of their functions may be implemented in one module. In exemplary embodiments, the structural characteristics may include at least one of total key number, total level number and key number in each level of the record.

In one embodiment, the schema coarse division unit 1202 can comprise: a first encoding and sorting unit configured to encode the keys of the lowest level of the record according to a codemap of the schema bucket for the lowest level of the record, and sort the keys of the lowest level that belong to different parent keys respectively; a key name updating unit configured to update key names of corresponding parent keys in the parent level of a children level according to the codes of the keys of the children level; a second encoding and sorting unit configured to encode the keys of the parent level based on the updated key names of the parent level according to a codemap for the parent level of the schema bucket, and sort the keys of the parent level that belong to different parent keys respectively; and an iterative processing unit configured to control the key name updating unit and the second encoding and sorting unit to perform process in order from the level right above the lowest level to the highest level. Here, the record schema of the record is identified according to a code sequence formed by encoding and sorting keys of the highest level together with an identifier of the schema bucket.

In another embodiment, the schema fine division unit 1202 comprises: an encoding unit configured to encode the keys of the lowest level of the record according to a codemap of the schema bucket for the lowest level of the record; a sub-bucket assigning unit configured to assign the record to a schema sub-bucket which is identified by a code sequence formed by integrally sorting the codes of the keys of the lowest level within the schema bucket; a key name updating unit configured to update key names of corresponding parent keys in the parent level of the lowest level according to code sequences which are formed by sorting the codes of the keys of the lowest level respectively based on their parent keys; and an iterative processing unit configured to control the encoding unit, the sub-bucket assigning unit and the key name updating unit to take the updated parent level of the lowest level as the lowest level and taking the schema sub-bucket as the schema bucket to perform iterative processing until sub-bucket assignment according to the highest level of the record is completed. Here, the record schema of the record is identified by all the schema sub-buckets and the schema bucket to which the record is assigned.

In addition, optionally, the encoding unit, the first encoding and sorting unit and/or the second encoding and sorting unit can be further configured to update the codemap for a specific level according to key names of the specific level before the specific level of the record is encoded.

The above devices for identifying record schemas in a non-relational database according to the disclosure can identify isomorphic record schemas in the non-relational database efficiently, especially for those non-relational databases with huge amount of data and with data adding and updating continuously. Those devices can speed up building or updating the metadata repository of the non-relational database, so that the performance of the database can be improved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device for identifying record schemas in a non-relational database, the computing device having a processor that comprises:
    a schema coarse division unit configured to assign a record to a schema bucket according to structural characteristics of the record; and
    a schema fine division unit, configured to identify a record schema of the record within the schema bucket so that records with isomorphic record schemas in the non-relational database can be determined; wherein:
    the schema fine division unit comprises:
        a first encoding and sorting unit configured to encode the keys of the lowest level of the record according to a codemap of the schema bucket for the lowest level of the record, and sort the keys of the lowest level that belong to different parent keys respectively;
        a key name updating unit configured to update key names of corresponding parent keys in the parent level of a children level according to the codes of the keys of the children level;
        a second encoding and sorting unit configured to encode the keys of the parent level based on the updated key names of the parent level according to a codemap for the parent level of the schema bucket, and sort the keys of the parent level that belong to different parent keys respectively; and
        an iterative processing unit configured to control the key name updating unit and the second encoding and sorting unit to perform process in order from the level right above the lowest level to the highest level,
        wherein the record schema of the record is identified according to a code sequence formed by encoding and sorting keys of the highest level together with an identifier of the schema bucket.

2. The computing device of claim 1, wherein the structural characteristics comprise at least one of a total key number, a total level number and a key number in each level of the record.

3. A computing device for identifying record schemas in a non-relational database, the computing device having a processor that comprises:
- a schema coarse division unit configured to assign a record to a schema bucket according to structural characteristics of the record; and
- a schema fine division unit, configured to identify a record schema of the record within the schema bucket so that records with isomorphic record schemas in the non-relational database can be determined; wherein:

the schema fine division unit comprises:
- an encoding unit configured to encode the keys of the lowest level of the record according to a codemap of the schema bucket for the lowest level of the record;
- a sub-bucket assigning unit configured to assign the record to a schema sub-bucket which is identified by a code sequence formed by integrally sorting the codes of the keys of the lowest level within the schema bucket;
- a key name updating unit configured to update key names of corresponding parent keys in the parent level of the lowest level according to code sequences which are formed by sorting the codes of the keys of the lowest level respectively based on their parent keys; and
- an iterative processing unit configured to control the encoding unit, the sub-bucket assigning unit and the key name updating unit to take the updated parent level of the lowest level as the lowest level and taking the schema sub-bucket as the schema bucket to perform iterative processing until sub-bucket assignment according to the highest level of the record is completed, wherein the record schema of the record is identified by all the schema sub-buckets and the schema bucket to which the record is assigned.

4. The computing device of claim 3, wherein the structural characteristics comprise at least one of a total key number, a total level number and a key number in each level of the record.

* * * * *